March 31, 1931.  L. W. SHUTTS  1,798,956
CARBURETING APPARATUS FOR SLIDE VALVE ENGINES
Filed May 17, 1929
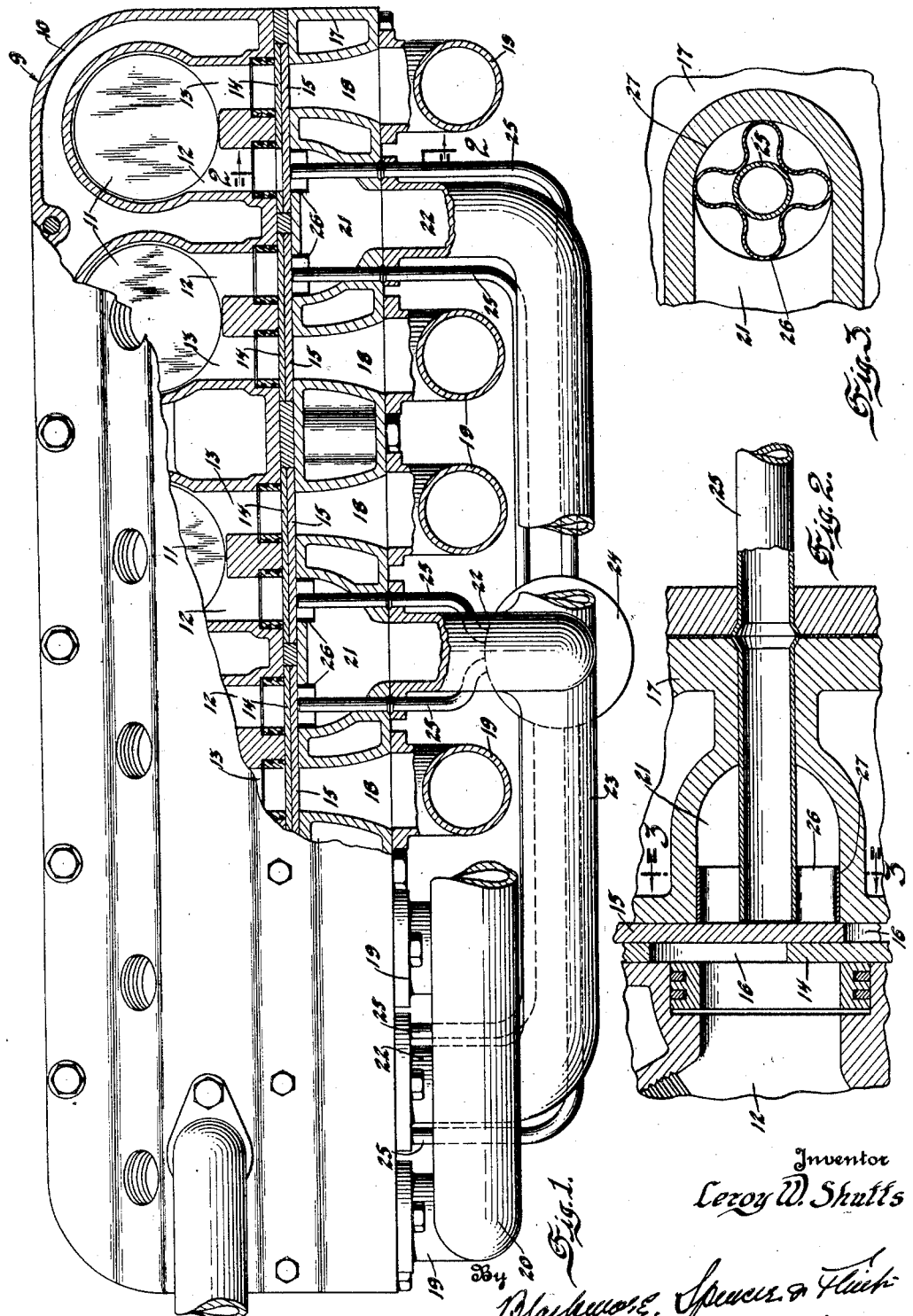

Patented Mar. 31, 1931

1,798,956

UNITED STATES PATENT OFFICE

LEROY W. SHUTTS, OF DETROIT, MICHIGAN, ASSIGNOR TO GENERAL MOTORS RESEARCH CORPORATION, OF DETROIT, MICHIGAN, A CORPORATION OF DELAWARE

CARBURETING APPARATUS FOR SLIDE-VALVE ENGINES

Application filed May 17, 1929. Serial No. 363,943.

This invention relates to the installation on an internal combustion engine of carbureting apparatus of the type in which a very rich primary mixture and the secondary air necessary to produce a combustible mixture containing the desired proportions of fuel and air are conducted to the intake ports of the engine cylinders through separate passages and are not mixed until immediately before they are introduced into the engine cylinders.

Such an installation ordinarily includes a secondary air intake manifold which includes a plurality of intercommunicating branches of which each leads to one or a pair of the intake ports of the cylinders of the engine, and primary mixture tubes, of which each terminates at a point adjacent one or a pair of the intake ports of the cylinders of the engine. In a multi-cylinder engine, the periods at which the several intake ports are open overlap, with the result that there is at all times, when the engine is running, a vacuum in the secondary air intake manifold. As a result of this condition, in an installation of the type described above, there is at all times, when the engine is running, a tendency for primary mixture to be discharged from the ends of the primary mixture tubes adjacent the engine intake ports, and, consequently, for primary mixture to "pile up" in front of the intake ports while they are closed. The "piling up" of primary mixture in front of the closed intake ports causes some of the cylinders to be supplied with a richer combustible mixture than others, and causes uneven and generally unsatisfactory operation of the engine.

I have found that if, in installing carbureting apparatus of the type described above on an internal combustion engine provided with sliding and/or rotating intake valves, the primary mixture tubes are extended so that their discharge ends terminate in close proximity to the faces of the valves, the valves will, in addition to controlling the intake periods, prevent discharge of primary mixture tube when the intake port of the cylinder which it supplies is not open, and, consequently, prevent "piling up" of primary mixture with the resultant undesirable effects mentioned above.

For a better understanding of the nature and objects of the present invention, reference is made to the following specification in which is described the preferred embodiment of my invention, which is illustrated in the accompanying drawing.

In the accompanying drawing:

Figure 1 is a more or less diagrammatic top plan view, with parts broken away and in section, of an internal combustion engine in which is embodied my invention.

Figure 2 is an enlarged fragmentary section taken on the line 2—2 of Figure 1.

Figure 3 is a fragmentary section taken on the line 3—3 of Figure 2.

In the drawing, the reference character 9 indicates a six-cylinder internal combustion engine of the slide valve type. The engine consists of a cylinder block 10, in which are provided a plurality of cylinders 11, into each of which extends an intake port 12 and an exhaust port 13. To control the intake and exhaust periods, there are provided for each cylinder, inner and outer slide valves 14 and 15, arranged to reciprocate in substantially vertical planes. Each of the slide valves of each pair is provided, on one side of its longitudinal axis, with an exhaust port (not shown), and, on the opposite side of its longitudinal axis, with an intake port 16. The intake ports and the exhaust ports in the valves of each pair are so arranged that they are adapted to register with each other and the corresponding cylinder port to permit intake of combustible mixture and discharge of exhaust gases at the proper intervals.

The slide valves are arranged to reciprocate between a lateral face of the cylinder block and the inner face of a cover plate 17, which is secured to the cylinder block. Through the cover plate extend passages 18, of which each is coaxial with, and forms an extension of, one of the exhaust passages 13 in the cylinder block. The outer end of each of the exhaust passages 18 in the cover plate communicates with a branch 19 of the exhaust manifold 20. The pair of intake passages 12 in each pair of adjacent cylinders communicates with a passage 21 which extends through the cover plate. Each of the passages 21 communicates at its outer end, with a branch 22 of the secondary air intake manifold 23 through which air is adapted to be conducted from the atmosphere to the intake ports of the engine cylinders.

The reference character 24 indicates what may be termed the carburetor, i. e., the mixing or metering block, or other device, in which the fuel which is to be supplied to the engine cylinders is mixed with the primary air. There extend from this chamber a plurality of primary mixture tubes 25, in number equal to the number of cylinders of the engine. Each of the primary mixture tubes extends through the outer wall of the cover plate and into one of the intake passages 21 therein, and terminates at a point in close proximity to the outer face of the intake side of one of the outer slide valves 15. The discharge end of each of the primary mixture tubes is spaced a few thousandths of an inch from the outer face of the corresponding valve 15, merely to prevent mechanical interference between the valve and the tube, and is supported by a deeply corrugated sleeve 26, which engages, exteriorly, the walls of a circular opening 27 in the inner side of the cover plate 17, and, interiorly, the outer wall of the tube.

The operating mechanism for the outer valve 15 of each pair is so arranged that the intake port 16 in the valve does not uncover the end of the primary mixture tube 25 except when the corresponding cylinder intake port is open, or is being opened or closed, by the valves 14 and 15. Consequently, when the engine is running and the intake port of any particular cylinder is closed, the primary mixture tube for that cylinder is sealed by the corresponding outer valve 15 and no fuel can be discharged therefrom at this time. However, when the intake port is opened, there is a clear passage from the discharge end of the primary mixture tube to the cylinder, through which the primary mixture and the secondary air may pass into the cylinder.

I claim:

1. In an internal combustion engine which is provided with an intake valve which has sliding engagement with its seat, a conduit for conducting air to a point adjacent the engine port, and a primary mixture tube extending to a point adjacent the intake port and terminating at such a point that the discharge of fuel therefrom is controlled by the intake valve.

2. The invention claimed in claim 1, and means for rigidly supporting the discharge end of the primary mixture tube.

3. In an internal combustion engine in which there are provided inner and outer valves which have sliding engagement with their seats for controlling an intake port, a mixture tube terminating in close proximity to the outer surface of the outer valve so that the discharge of the mixture therefrom is controlled by the valve.

In testimony whereof I affix my signature.

LEROY W. SHUTTS.